(12) United States Patent
Medles

(10) Patent No.: US 10,855,403 B2
(45) Date of Patent: Dec. 1, 2020

(54) METHOD AND APPARATUS FOR REDUCING UPLINK OVERHEAD IN MOBILE COMMUNICATIONS

(71) Applicant: MediaTek Singapore Pte. Ltd., Singapore (SG)

(72) Inventor: Abdelkader Medles, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/261,396

(22) Filed: Jan. 29, 2019

(65) Prior Publication Data

US 2019/0253196 A1 Aug. 15, 2019

Related U.S. Application Data

(60) Provisional application No. 62/629,744, filed on Feb. 13, 2018.

(51) Int. Cl.
*H04L 1/18* (2006.01)
*H04W 72/12* (2009.01)

(52) U.S. Cl.
CPC ....... *H04L 1/1812* (2013.01); *H04W 72/1268* (2013.01)

(58) Field of Classification Search
CPC .......................... H04L 1/1812; H04W 72/1268
USPC ........................................ 370/310, 328, 329
See application file for complete search history.

(56) References Cited

U.S. PATENT DOCUMENTS

| | | |
|---|---|---|
| 2012/0269103 A1 | 10/2012 | Papasakellariou et al. |
| 2015/0124762 A1 | 5/2015 | Yie et al. |
| 2016/0295561 A1* | 10/2016 | Papasakellariou .. H04W 72/042 |
| 2016/0338034 A1* | 11/2016 | Aiba ...................... H04L 1/0026 |
| 2018/0098345 A1* | 4/2018 | Tiirola ................. H04B 7/0456 |
| 2018/0241510 A1* | 8/2018 | Shen ......................... H04L 1/18 |

FOREIGN PATENT DOCUMENTS

| | | |
|---|---|---|
| CN | 105379156 A | 3/2016 |
| WO | WO 2012144832 A2 | 10/2012 |
| WO | WO 2017010477 A1 | 1/2017 |
| WO | WO 2017196059 A1 | 11/2017 |

OTHER PUBLICATIONS

China National Intellectual Property Administration, International Search Report and Written Opinion or International Patent Application No. PCT/CN2019/074136, dated Apr. 28, 2019.

Taiwan Intellectual Property Office, Office Action for Taiwan Patent Application No. 108103479, dated Nov. 29, 2019.

* cited by examiner

*Primary Examiner* — Obaidul Huq
(74) *Attorney, Agent, or Firm* — Han IP PLLC; Andy M. Han

(57) ABSTRACT

Various solutions for reducing uplink overhead with respect to user equipment and network apparatus in mobile communications are described. An apparatus may determine whether to multiplex hybrid automatic repeat request-acknowledgement (HARQ-ACK) information in a physical uplink shared channel (PUSCH) transmission. The apparatus may determine whether only a physical downlink shared channel (PDSCH) is received. The apparatus may generate only the HARQ-ACK information corresponding to the PDSCH in an event that only the PDSCH is received. The apparatus may transmit the HARQ-ACK information in the PUSCH transmission.

18 Claims, 3 Drawing Sheets

METHOD AND APPARATUS FOR REDUCING UPLINK OVERHEAD IN MOBILE COMMUNICATIONS

CROSS REFERENCE TO RELATED PATENT APPLICATION(S)

The present disclosure is part of a non-provisional application claiming the priority benefit of U.S. Patent Application No. 62/629,744, filed on 13 Feb. 2018, the content of which is incorporated by reference in its entirety.

TECHNICAL FIELD

The present disclosure is generally related to mobile communications and, more particularly, to reducing uplink overhead with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), Type-1 hybrid automatic repeat request-acknowledgement (HARQ-ACK) codebook transmission is introduced to improve transmission reliability. When a user equipment (UE) is configured with "physical downlink shared channel (pdsch)-HARQ-ACK-Codebook=semi-static", the UE needs to report HARQ-ACK information for a corresponding PDSCH reception or semi-persistent scheduling (SPS) PDSCH release in a HARQ-ACK codebook. The HARQ-ACK codebook should be transmitted in a slot indicated by a value of a PDSCH-to-HARQ_feedback timing indicator field in a corresponding downlink control information (DCI) format.

However, the HARQ-ACK codebook Type 1 may lead to increased overhead on the uplink. The UE may need to transmit additional HARQ-ACK information or full HARQ-ACK codebook on the uplink and may increase the uplink signaling overhead. Even if there is no data or only a few data received on PDSCH occasions, the HARQ-ACK information or full HARQ-ACK codebook may still be transmitted. This may lead to higher UE power consumption and increased radio interferences.

Accordingly, how to reduce uplink overhead and save UE power consumption may be important in the newly developed communication system. It is needed to provide proper mechanisms to reduce the semi-static HARQ-ACK codebook according to some rules.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to reducing uplink overhead with respect to user equipment and network apparatus in mobile communications.

In one aspect, a method may involve an apparatus determining whether to multiplex HARQ-ACK information in a physical uplink shared channel (PUSCH) transmission. The method may also involve the apparatus determining whether only a PDSCH is received. The method may further involve the apparatus generating only the HARQ-ACK information corresponding to the PDSCH in an event that only the PDSCH is received. The method may further involve the apparatus transmitting the HARQ-ACK information in the PUSCH transmission.

In one aspect, an apparatus may comprise a transceiver capable of wirelessly communicating with a network node of a wireless network. The apparatus may also comprise a processor communicatively coupled to the transceiver. The processor may be capable of determining whether to multiplex HARQ-ACK information in a PUSCH transmission. The processor may also be capable of determining whether only a PDSCH is received. The processor may further be capable of generating only the HARQ-ACK information corresponding to the PDSCH in an event that only the PDSCH is received. The processor may further be capable of transmitting the HARQ-ACK information in the PUSCH transmission.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to reducing uplink overhead with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, Type-1 HARQ-ACK codebook transmission is introduced to improve transmission reliability. When the UE is configured with "pdsch-HARQ-ACK-Codebook=semi-static", the UE needs to report HARQ-ACK information for a corresponding PDSCH receptions or SPS PDSCH releases in a HARQ-ACK codebook. The HARQ-ACK codebook should be transmitted in a slot indicated by a value of a PDSCH-to-HARQ_feedback timing indicator field in a corresponding DCI format.

However, the HARQ-ACK codebook Type 1 may lead to increased overhead on the uplink. The UE may need to transmit additional HARQ-ACK information or full HARQ-ACK codebook on the uplink and may increase the uplink signaling overhead. Even if there is no data or only a few data received on PDSCH occasions, the HARQ-ACK information or full HARQ-ACK codebook may still be transmitted. This may lead to higher UE power consumption and increased radio interferences.

To reduce the signaling overhead, some rules may need to be defined to avoid send HARQ-ACK information or full HARQ-ACK codebook when it is not required. The UE may need to determine whether to transmit the full semi-static HARQ-ACK codebook or not according to the pre-defined rules. The present disclosure proposes a number of schemes pertaining to reducing the uplink signaling overhead. According to the schemes of the present disclosure, the UE may reduce the HARQ-ACK information when some rules/scenarios are satisfied.

Figure 1:
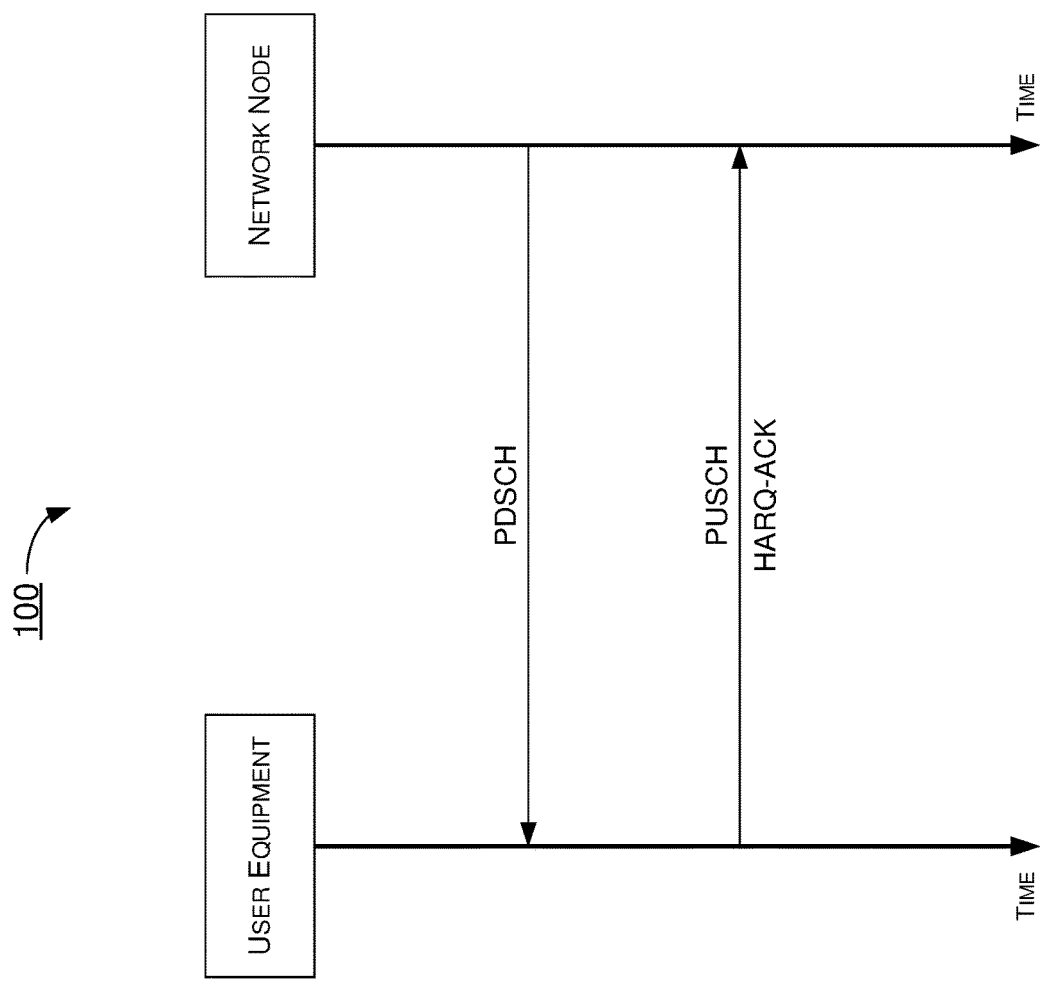
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured to camp on the network node. The UE may be configured to monitor a downlink control channel (e.g., PDCCH) of the network node. The UE may monitor a plurality of PDCCH monitoring occasions to see whether there exist any DCI for the UE. The network node may use the DCI to schedule radio resources for a downlink channel (e.g., PDSCH) or an uplink channel (e.g., PUSCH). The UE may be configured to determine whether to transmit a HARQ-ACK feedback according to the monitoring results.

For example, the DCI format 1_0 or DCI format 1_1 may be used to schedule the PDSCH of the network node. In an event that at least one DCI (e.g., DCI format 1_0, DCI format 1_1, or associated DCI for PDSCH transmission) is detected by the UE, it means that there is downlink data scheduled on the PDSCH for the UE. The UE may be configured to receive the downlink data on the PDSCH according to the DCI. The UE may further be configured to transmit a HARQ-ACK feedback corresponding to the downlink data to the network node. The UE may transmit the HARQ-ACK feedback on an uplink channel (e.g., PUCCH or PUSCH). For example, the UE may multiplex the HARQ-ACK feedback in the uplink channel transmission. The uplink channel may be scheduled by the DCI format 0_0 or DCI format 0_1 (e.g., PUSCH).

According to $3^{rd}$ Generation Partnership Project (3GPP) specifications, when the UE multiplexes the HARQ-ACK feedback in a PUSCH transmission, the UE will generate the full HARQ-ACK codebook for the HARQ-ACK feedback. For example, the full HARQ-ACK codebook may comprise the HARQ-ACK information for 8 slots. Each slot may have its own PDSCH. The full HARQ-ACK codebook may comprise up to 240 bits. This will lead to large overhead problems especially when no corresponding PDSCH or only a PDSCH is received. Accordingly, the present disclosure proposes a number of schemes to reduce the overhead of the HARQ-ACK feedback.

The UE may be configured to determine whether some specific rules/scenarios are satisfied. In an event that the specific rules/scenarios are satisfied, the UE may be configured to cancel the generation of a full HARQ-ACK codebook or reduce the control overhead of the HARQ-ACK information. The UE may be able to fallback to a single HARQ-ACK transmission. Specifically, the UE may be configured to determine whether to multiplex HARQ-ACK information in a PUSCH transmission. The PUSCH transmission may be not scheduled by a DCI format or may be scheduled by the DCI format 0_0. The UE may be further configured to determine whether only a PDSCH (e.g., single PDSCH) is received. For example, only a SPS PDSCH release, only a SPS PDSCH reception or only a PDSCH is received. The PDSCH may be scheduled by the DCI format 1_0. In an event that the UE may multiplex HARQ-ACK information in a PUSCH transmission, and the UE receives only a PDSCH, the UE may be configured to generate only the HARQ-ACK information corresponding to the PDSCH (e.g., single PDSCH). For example, the UE may generate the HARQ-ACK information only for the SPS PDSCH release or only for the PDSCH reception. The UE may transmit the HARQ-ACK information (e.g., single HARQ-ACK) only for the SPS PDSCH release or only for the PDSCH reception in the PUSCH transmission.

Accordingly, since the UE only transmits the HARQ-ACK information corresponding to the received PDSCH (e.g., single PDSCH), the data amount or the signaling overhead of the HARQ-ACK feedback may be reduced. For example, the codebook size of the HARQ-ACK codebook may be reduced. The UE may be able to reduce power consumption due to less control overhead transmissions. On the other hand, the radio resources may be saved and the interferences may be avoided in view of the reduced uplink overhead transmissions.

In some implementations, the specific rules/scenarios may further comprise a downlink assignment index (DAI) field (e.g., $V_{T\text{-}DAL,m}^{UL}$) in the DCI or the receiving network node. The UE may be further configured to determine whether the DAI field is assigned (e.g., $V_{T\text{-}DAL,m}^{UL}=1$), or whether the PDSCH is received from a primary cell (PCell). For example, in an even that the UE receives only a SPS PDSCH release, or only a SPS PDSCH reception, or only a PDSCH that is scheduled by DCI format 1_0 with a counter DAI field value of 1 on the PCell in the occasions for candidate PDSCH receptions, the UE may be configured to generate the HARQ-ACK information only for the SPS PDSCH release or only for the PDSCH reception.

In some implementations, the UE may be configured to determine whether to multiplex HARQ-ACK information in a PUSCH transmission that is scheduled by DCI format 0_1. For example, in an event that the UE may multiplex HARQ-ACK information in a PUSCH transmission that is scheduled by DCI format 0_1, and the UE receives only a SPS PDSCH release, or only a SPS PDSCH, or only a PDSCH that is scheduled by DCI format 1_0 with a counter DAI field value of 1 on the PCell in the occasions for candidate PDSCH receptions, the UE may be configured to generate the HARQ-ACK information only for the SPS PDSCH release or only for the PDSCH reception.

In some implementations, the UE may be configured to determine whether no PDSCH is received. In an event that the UE receives no PDSCH, the UE may be configured to cancel the generation of the HARQ-ACK information (e.g., not to generate the HARQ-ACK information). The UE may not transmit any HARQ-ACK information to the network node. Alternatively, in an event that the UE receives no PDSCH, the UE may be configured to generate the HARQ-ACK information by assuming that only a single PDSCH from the PCell is received. The UE may only transmit the HARQ-ACK information for the single PDSCH.

Illustrative Implementations

Figure 2:
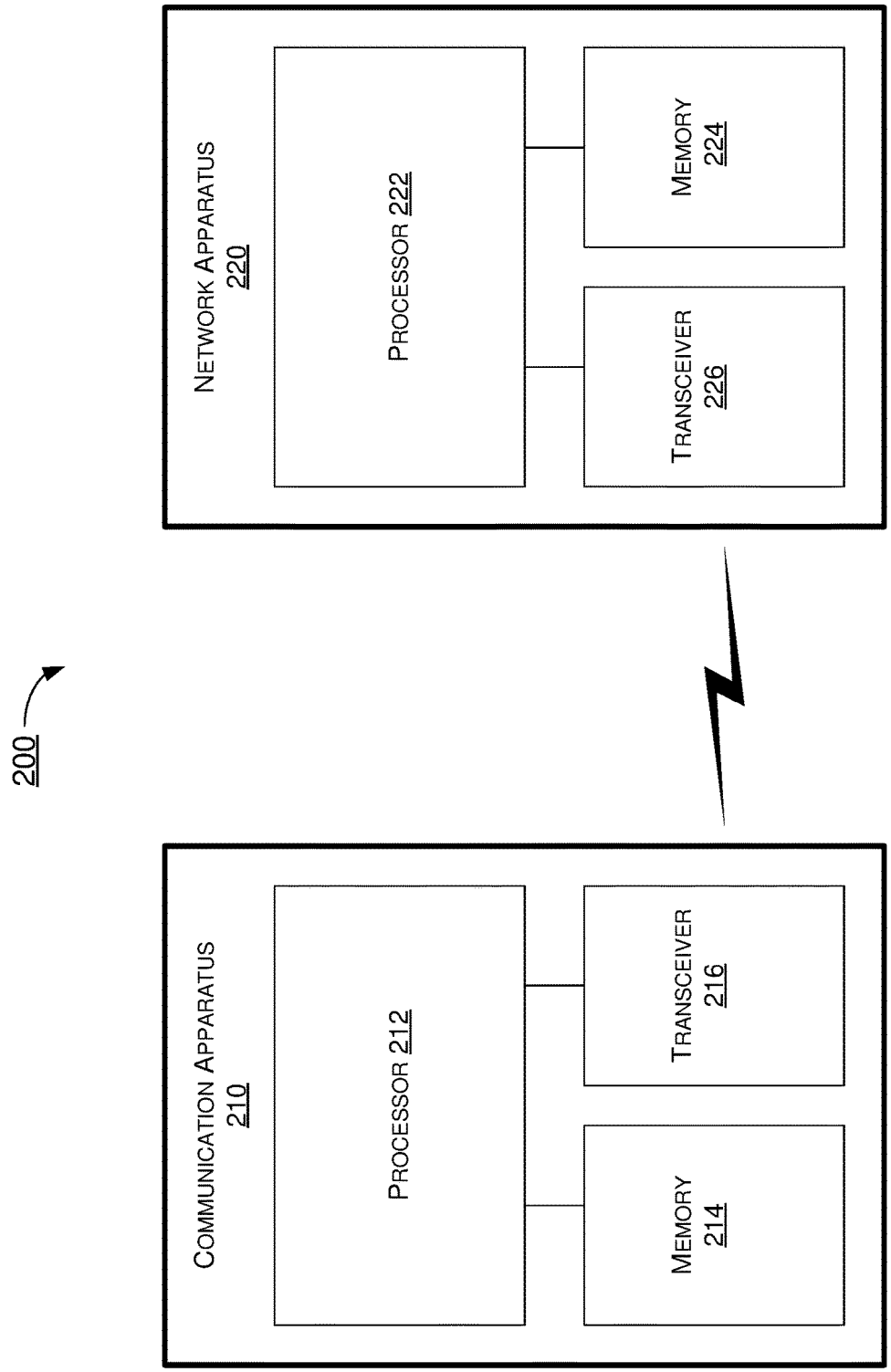
FIG. 2 is a block diagram of an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to reducing uplink overhead with respect to user equipment and network apparatus in wireless communications, including scenario 100 described above as well as process 300 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT or NB-IoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in an LTE, LTE-Advanced or LTE-Advanced Pro network or in a gNB in a 5G, NR, IoT or NB-IoT network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more RISC or CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE and network apparatus 220 is implemented in or as a network node of a communication network.

In some implementations, processor 212 may be configured to camp on network apparatus 220. Processor 212 may be configured to monitor, via transceiver 216, a downlink control channel (e.g., PDCCH) of network apparatus 220. Processor 212 may monitor a plurality of PDCCH monitoring occasions to see whether there exist any DCI for communication apparatus 210. Network apparatus 220 may use the DCI to schedule radio resources for a downlink channel (e.g., PDSCH) or an uplink channel (e.g., PUSCH). Processor 212 may be configured to determine whether to transmit a HARQ-ACK feedback according to the monitoring results.

In some implementations, network apparatus 220 may use the DCI format 1_0 or DCI format 1_1 to schedule the PDSCH. In an event that at least one DCI (e.g., DCI format 1_0, DCI format 1_1, or associated DCI for PDSCH transmission) is detected by processor 212, it means that there is downlink data scheduled on the PDSCH for communication apparatus 210. Processor 212 may be configured to receive, via transceiver 216, the downlink data on the PDSCH according to the DCI. Processor 212 may further be configured to transmit, via transceiver 316, a HARQ-ACK feedback corresponding to the downlink data to network apparatus 220. Processor 212 may transmit the HARQ-ACK feedback on an uplink channel (e.g., PUCCH or PUSCH). For example, processor 212 may multiplex the HARQ-ACK feedback in the uplink channel transmission. The uplink channel may be scheduled by the DCI format 0_0 or DCI format 0_1 (e.g., PUSCH).

In some implementations, processor 212 may be configured to determine whether some specific rules/scenarios are satisfied. In an event that the specific rules/scenarios are satisfied, processor 212 may be configured to cancel the generation of a full HARQ-ACK codebook or reduce the control overhead of the HARQ-ACK information. Processor 212 may be able to fallback to a single HARQ-ACK transmission. Specifically, processor 212 may be configured to determine whether to multiplex HARQ-ACK information in a PUSCH transmission. The PUSCH transmission may be not scheduled by a DCI format or may be scheduled by the DCI format 0_0. Processor 212 may be further configured to determine whether only a PDSCH (e.g., single PDSCH) is received. For example, only a SPS PDSCH release, only a SPS PDSCH reception or only a PDSCH is received. The PDSCH may be scheduled by the DCI format 1_0. In an event that processor 212 may multiplex HARQ-ACK information in a PUSCH transmission, and processor 212 receives only a PDSCH, processor 212 may be configured to generate only the HARQ-ACK information corresponding to the PDSCH (e.g., single PDSCH). For example, processor 212 may generate the HARQ-ACK information only for the SPS PDSCH release or only for the PDSCH reception. Processor 212 may transmit, via transceiver 216, the HARQ-ACK information (e.g., single HARQ-ACK) only for the SPS PDSCH release or only for the PDSCH reception in the PUSCH transmission.

In some implementations, processor 212 may be further configured to determine whether the DAI field is assigned (e.g., $V_{T-DAL,m}^{UL}=1$), or whether the PDSCH is received from a primary cell (PCell). For example, in an even that processor 212 receives only a SPS PDSCH release, or only a SPS PDSCH reception, or only a PDSCH that is scheduled by DCI format 1_0 with a counter DAI field value of 1 on the PCell in the occasions for candidate PDSCH receptions, processor 212 may be configured to generate the HARQ-ACK information only for the SPS PDSCH release or only for the PDSCH reception.

In some implementations, processor 212 may be configured to determine whether to multiplex HARQ-ACK information in a PUSCH transmission that is scheduled by DCI format 0_1. For example, in an event that processor 212 may multiplex HARQ-ACK information in a PUSCH transmission that is scheduled by DCI format 0_1, and processor 212 receives only a SPS PDSCH release, or only a SPS PDSCH, or only a PDSCH that is scheduled by DCI format 1_0 with a counter DAI field value of 1 on the PCell in the occasions for candidate PDSCH receptions, processor 212 may be configured to generate the HARQ-ACK information only for the SPS PDSCH release or only for the PDSCH reception.

In some implementations, processor 212 may be configured to determine whether no PDSCH is received. In an event that processor 212 receives no PDSCH, processor 212 may be configured to cancel the generation of the HARQ-ACK information (e.g., not to generate the HARQ-ACK information). Processor 212 may not transmit any HARQ-ACK information to network apparatus 220. Alternatively, in an event that processor 212 receives no PDSCH, processor 212 may be configured to generate the HARQ-ACK information by assuming that only a single PDSCH from the PCell is received. Processor 212 may only transmit, via transceiver 216, the HARQ-ACK information for the single PDSCH.

Illustrative Processes

Figure 3:
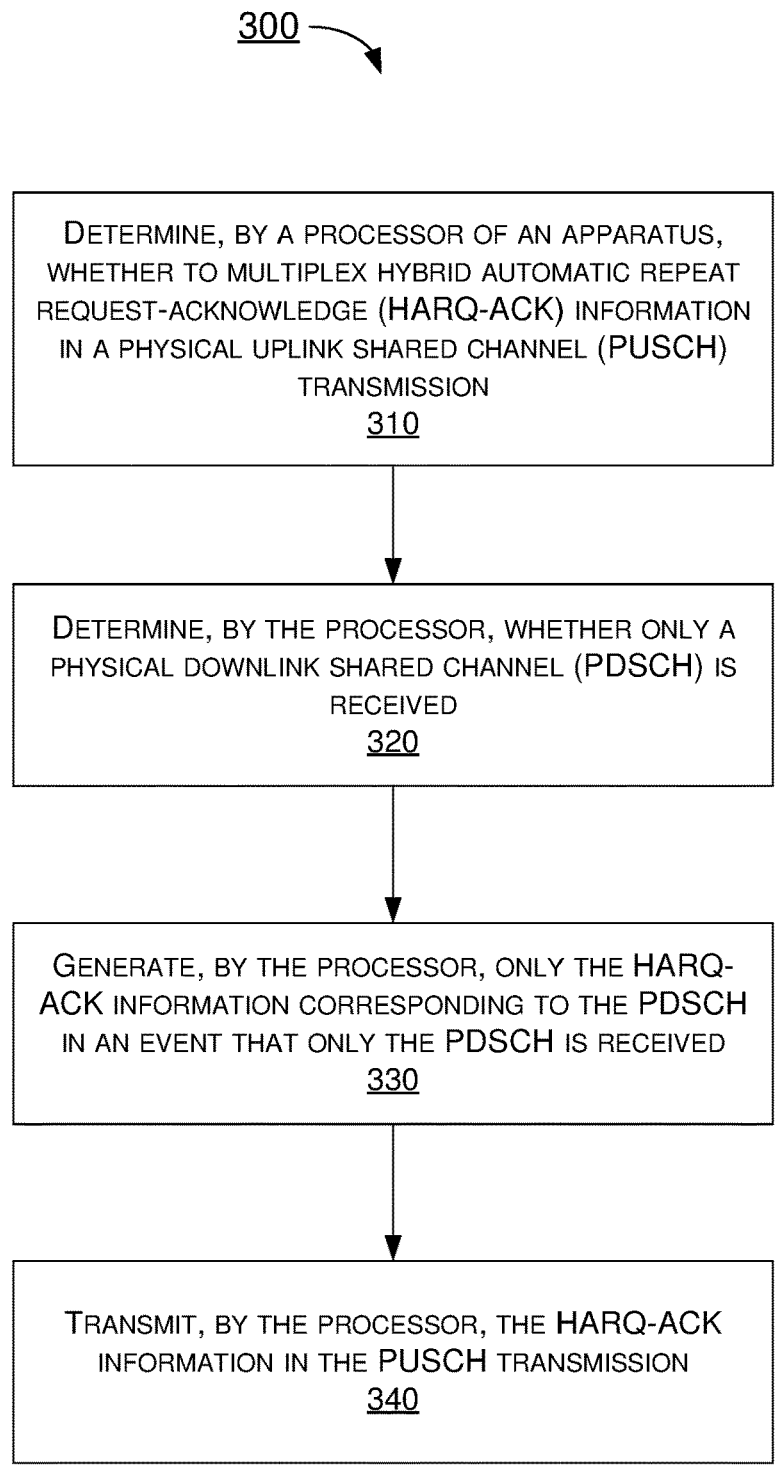
FIG. 3 is a flowchart of an example process in accordance with an implementation of the present disclosure.

FIG. 3 illustrates an example process 300 in accordance with an implementation of the present disclosure. Process 300 may be an example implementation of scenario 100, whether partially or completely, with respect to reducing uplink overhead in accordance with the present disclosure. Process 300 may represent an aspect of implementation of features of communication apparatus 210. Process 300 may include one or more operations, actions, or functions as illustrated by one or more of blocks 310, 320, 330 and 340. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210. Process 300 may begin at block 310.

At 310, process 300 may involve processor 212 of apparatus 210 determining whether to multiplex HARQ-ACK information in a PUSCH transmission. Process 300 may proceed from 310 to 320.

At 320, process 300 may involve processor 212 determining whether only a PDSCH is received. Process 300 may proceed from 320 to 330.

At 330, process 300 may involve processor 212 generating only the HARQ-ACK information corresponding to the PDSCH in an event that only the PDSCH is received. Process 300 may proceed from 330 to 340.

At 340, process 300 may involve processor 212 transmitting the HARQ-ACK information in the PUSCH transmission.

In some implementations, the PUSCH transmission may be not scheduled by a DCI format.

In some implementations, the PUSCH transmission may be scheduled by a DCI format 0_0.

In some implementations, the PUSCH transmission may be scheduled by a DCI format 0_1.

In some implementations, the PDSCH may comprise a SPS PDSCH release or a SPS PDSCH reception.

In some implementations, the PDSCH may be scheduled by a DCI format 1_0.

In some implementations, the PDSCH may be received from a PCell.

In some implementations, process 300 may involve processor 212 cancelling generation of a full HARQ-ACK codebook.

In some implementations, process 300 may involve processor 212 reducing a control overhead of the HARQ-ACK information.

In some implementations, process 300 may involve processor 212 determining whether no PDSCH is received. Process 300 may further involve processor 212 cancelling generation of the HARQ-ACK information in an event that no PDSCH is received.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, whether to multiplex hybrid automatic repeat request-acknowledgement (HARQ-ACK) information in a physical uplink shared channel (PUSCH) transmission;
   determining, by the processor, that only a physical downlink shared channel (PDSCH) is received;
   receiving, by the processor, a downlink control information (DCI) transmission;
   generating, by the processor, only the HARQ-ACK information corresponding to the PDSCH in an event that only the PDSCH is received and despite determining to multiplex the HARQ-ACK information; and
   transmitting, by the processor, the HARQ-ACK information in the PUSCH transmission,
   wherein, in response to a downlink assignment index (DAI) field in the DCI being assigned or the PDSCH being received from a primary cell (PCell), the HARQ-ACK information comprises a single HARQ-ACK corresponding to the received PDSCH instead of a full HARQ-ACK codebook to result in reduced uplink overhead.

2. The method of claim 1, wherein the PUSCH transmission is not scheduled by a downlink control information (DCI) format.

3. The method of claim 1, wherein the PUSCH transmission is scheduled by a downlink control information (DCI) format 0_0.

4. The method of claim 1, wherein the PUSCH transmission is scheduled by a downlink control information (DCI) format 0_1.

5. The method of claim 1, wherein the PDSCH comprises a semi-persistent scheduling (SPS) PDSCH release or a SPS PDSCH reception.

6. The method of claim 1, wherein the PDSCH is scheduled by a downlink control information (DCI) format 1_0.

7. The method of claim 1, wherein the generating comprises cancelling generation of a full HARQ-ACK codebook.

8. The method of claim 1, wherein the generating comprises reducing a control overhead of the HARQ-ACK information.

9. The method of claim 1, further comprising:
determining, by the processor, whether no PDSCH is received; and
cancelling, by the processor, generation of the HARQ-ACK information in an event that no PDSCH is received.

10. An apparatus, comprising:
a transceiver capable of wirelessly communicating with a network node of a wireless network; and
a processor communicatively coupled to the transceiver, the processor capable of:
determining whether to multiplex hybrid automatic repeat request-acknowledgement (HARQ-ACK) information in a physical uplink shared channel (PUSCH) transmission;
determining that only a physical downlink shared channel (PDSCH) is received;
receiving, via the transceiver, a downlink control information (DCI) transmission;
generating only the HARQ-ACK information corresponding to the PDSCH in an event that only the PDSCH is received and despite determining to multiplex the HARQ-ACK information; and
transmitting, via the transceiver, the HARQ-ACK information in the PUSCH transmission to the network node,
wherein, in response to a downlink assignment index (DAI) field in the DCI being assigned or the PDSCH being received from a primary cell (PCell), the HARQ-ACK information comprises a single HARQ-ACK corresponding to the received PDSCH instead of a full HARQ-ACK codebook to result in reduced uplink overhead.

11. The apparatus of claim 10, wherein the PUSCH transmission is not scheduled by a downlink control information (DCI) format.

12. The apparatus of claim 10, wherein the PUSCH transmission is scheduled by a downlink control information (DCI) format 0_0.

13. The apparatus of claim 10, wherein the PUSCH transmission is scheduled by a downlink control information (DCI) format 0_1.

14. The apparatus of claim 10, wherein the PDSCH comprises a semi-persistent scheduling (SPS) PDSCH release or a SPS PDSCH reception.

15. The apparatus of claim 10, wherein the PDSCH is scheduled by a downlink control information (DCI) format 1_0.

16. The apparatus of claim 10, wherein, in generating only the HARQ-ACK information corresponding to the PDSCH, the processor is capable of cancelling generation of a full HARQ-ACK codebook.

17. The apparatus of claim 10, wherein, in generating only the HARQ-ACK information corresponding to the PDSCH, the processor is capable of reducing a control overhead of the HARQ-ACK information.

18. The apparatus of claim 10, wherein the processor is further capable of:
determining whether no PDSCH is received; and
cancelling generation of the HARQ-ACK information in an event that no PDSCH is received.

* * * * *